United States Patent [19]
Laie

[11] Patent Number: 4,593,925
[45] Date of Patent: Jun. 10, 1986

[54] SAFETY HAULING COUPLER

[76] Inventor: Ching H. Laie, No. 3, Ming-ii Street, West District, Taichung City, Taiwan

[21] Appl. No.: 655,067

[22] Filed: Sep. 27, 1984

[51] Int. Cl.$^4$ .............................................. B60D 1/14
[52] U.S. Cl. .................................... 280/493; 280/484
[58] Field of Search ............... 280/480, 481, 482, 483, 280/484, 486, 487, 493

[56] References Cited

U.S. PATENT DOCUMENTS 1,768,304  6/1930  Ayler ................................... 280/493
2,023,527 12/1935  Johansen ............................. 280/486

FOREIGN PATENT DOCUMENTS 2359692  6/1975  Fed. Rep. of Germany ...... 280/482

Primary Examiner—John J. Love
Assistant Examiner—Charles R. Watts

[57] ABSTRACT

A safety hauling coupler characterized by comprising a buffer tube with a spring fitted there-over and a slot made therein, two extension tubes respectively fitted over and fixed to one end of the buffer tube by means of retaining pins, two connecting tubes respectively fitted in and fixed to the extension tubes at one end and hauling hooked heads at the other, two sleeves respectively fitted over the connecting tubes, two wire cables to be held by the hooks and attached to the supports of vehicles, and six retaining pin for fixing the said tubes, so that it can firmly join the hauling vehicle and that to be hauled and prevent the hauling vehicle from being hit by the hauled vehicle.

1 Claim, 3 Drawing Figures

SAFETY HAULING COUPLER

SUMMARY OF THE INVENTION

This invention relates to a safety hauling coupler with sleeves to retain and combine wire cables so that they can join any two vehicles for hauling purposes. A buffer tube and spring employed in this invention can effectively absorb the kinetic energy of the hauled vehicle occurring when the hauling vehicle brakes, and prevent the hauling vehicle from being hit and damaged by the hauled vehicle. The safety hauling coupler can be disassembled and is space-saving and portable for any kind of vehicle.

DETAILED DESCRIPTION OF THE INVENTION

Figure 1:
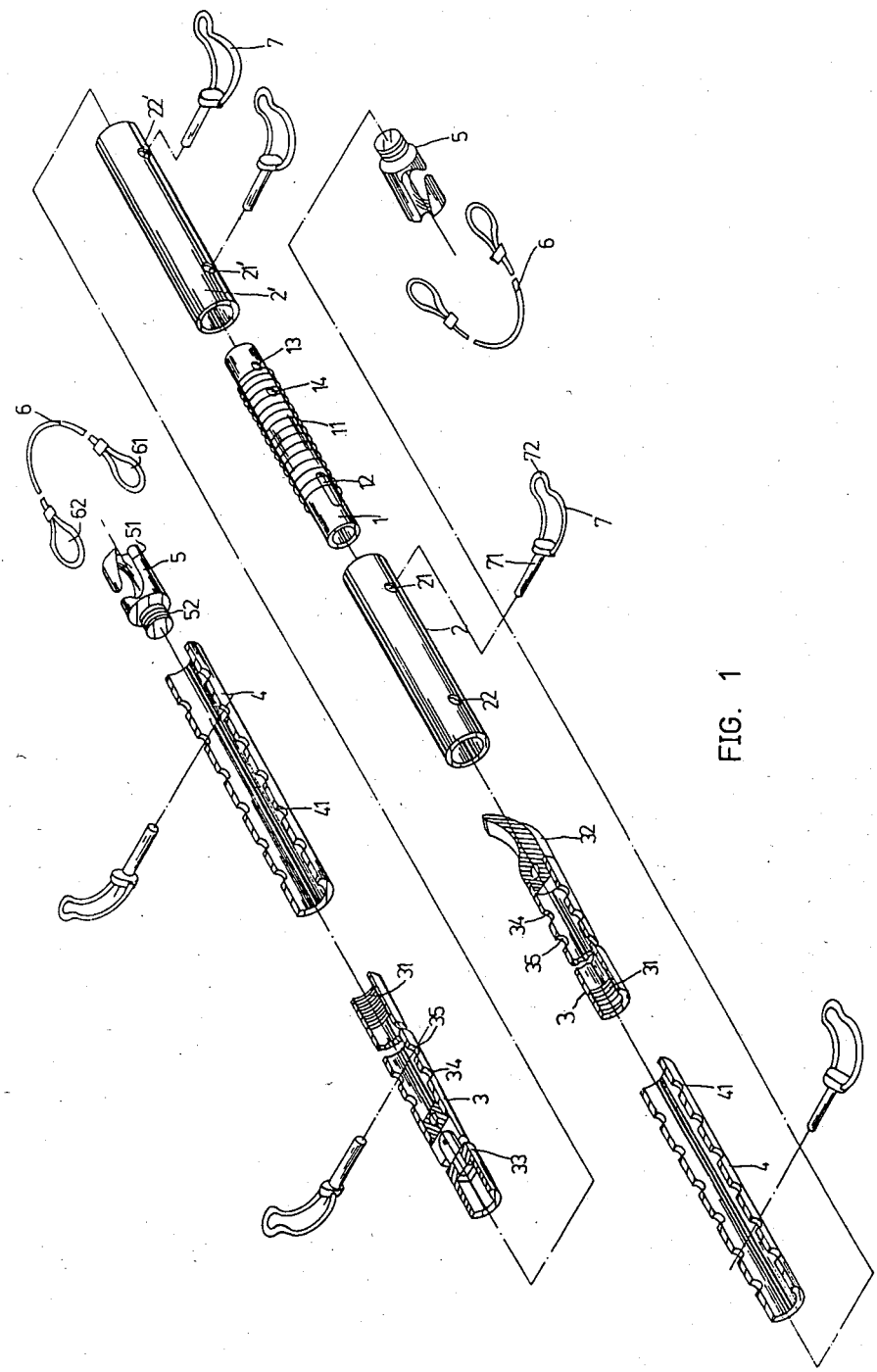
FIG. 1 is a sectional view of the safety hauling coupler of this invention.
Figure 2:
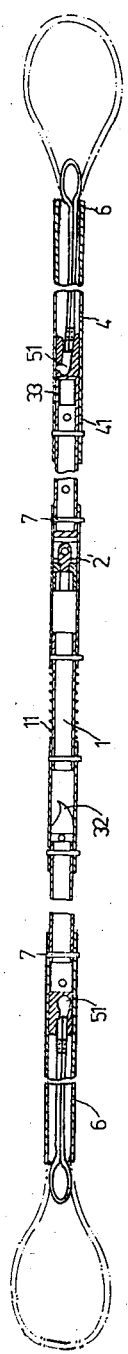
FIG. 2 is a vertical section of the safety hauling coupler as shown in FIG. 1.
Figure 3:
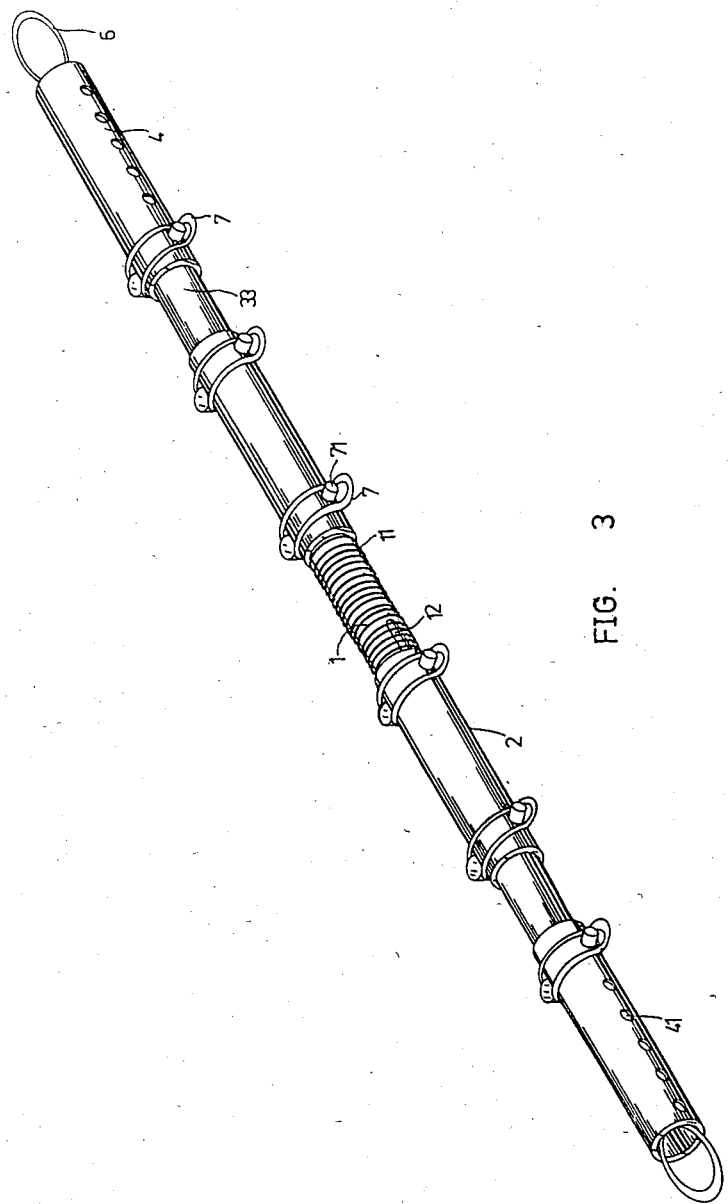
FIG. 3 is a vertical view of the safety hauling coupler as shown in FIG. 1.

A vehicle being out of order on the highway or damaged in an accident is usually hauled off the scene by another vehicle in good condition using a wire cable or rope to join them.

The use of wire cable or rope has the following disadvantages:

(a) The cable or rope is apt to loosen, break or twist.

(b) The hauling vehicle may be caught and hit by the hauled vehicle if the hauled vehicle's brake is out of order.

(c) It takes up too much space in storage and may be troublesome to transport.

For this reason, it is not common for a vehicle to carry a wire cable and few fleets of two or more vehicles are equipped with wire cables. For the same reason, the speed of hauling should be reduced as much as possible and could result in inconvenience to effective group operation.

An object of this invention is to provide a safety hauling coupler which will firmly join the hauling and hauled vehicles and ensure safe hauling without fear of being hit by the hauled vehicle, which is capable of being disassembled, is space-saving and convenient to carry on vehicles so that it can be widely used for salvaging and hauling.

In the prior art, the hauling coupler is a rod with hooks at both ends. It is too long for vehicles to carry along and it cannot be used as widely as the safety hauling coupler of this invention. Furthermore, it cannot absorb the shock load during starting and braking because it has no buffer.

Referring now to the drawings, the nature of this invention is described as follows:

As shown in FIG. 1 the safety hauling coupler of this invention comprises a buffer tube 1, two extension tubes 2, 2' two connecting tubes 3, two sleeves 4, two hooked heads 5, two wire cables 6, six retaining pins 7 and other elements. The buffer tube 1 has a spring 11 fitted thereabout a slot 12 and two pin holes 13, 14. Each of the two extension tubes 2 and 2' has two pin holes 21, 22 and 21', 22' respectively. One of the connecting tubes 3 has one end equipped with female threads 31 and the other end connected to a chisel-headed taper block 32. The other connecting tube 3 has one end equipped with female thread 31 and the other connected with a hexagon socket 33. The connecting tubes 3 also have pin holes 34, 35 respectively. The sleeves 4 also have pin holes 41 respectively. Each of the hooked heads 5 has a hook 51 at one end and male thread 52 at the other. Each of the wire cables 6 has loops 61, 62 at each end. Each of the six retaining pins 7 consists of a pin 71 and a spring retainer 72.

In assembling the coupler, the two extension tubes 2, 2' are fitted respectively over each end of the buffer tube 1 and fixed by means of two retaining pins 7 one of which is inserted in the pin holes 21' and 13 and the other in the pin hole 21 and the slot 12. To adjust the force of the spring 11 if necessary, the retaining pin 7 may be inserted in the pin holes 21' and 14 after they are aligned. The two extension tubes 2' are also fitted at the other end over the connecting tubes 3 and fixed by means of two retaining pins 7 which are inserted in the pin holes 22'. The other ends of the connecting tubes 3 with female threads 31 are screwed together with the hooked heads 5. The hooks 51 of the hooked heads 5 hold the loops 61, 62 of the wire cable 6. The connecting tubes 3, the hooked heads 5 and the wire cables 6 are fitted and confined in the sleeves 4 which are fixed to the connecting tubes 3 in position by means of retaining pins 7 inserting in the pin holes 41 in the sleeves and the pin holes 35 in the connecting tubes 3.

In use, the wire cable 6 at one end of the coupler is first put around a support of the vehicle to be hauled and fastened by the hook 51 by both loops 61, 62. Then the retaining pin 7 is removed and the sleeve 4 is pushed forward until the hooked head 5 and the wire cable 6 are firmly secured and confined in the sleeve 4. The sleeve 4 is then fixed in position to the connecting tube 3 by inserting the removed retaining pin 7 back in desired holes. The wire cable 6 at the other end is attached to a support for the hauling vehicle in the same way. Thus, it is ready to start hauling. When the salvaging vehicle brakes or is started, the spring 11 of the buffer tube 1 will absorb the kinetic energy and convert it into elastic potential energy. The hauled vehicle will stop slowly without catching and hitting the hauling vehicle and the persons and cargos in the vehicle will be free from impact shock. Furthermore, the tapered block 32 and the hexagon socket 33 can be used to hold and turn screws and nuts in repair before hauling. The safety hauling coupler is space-saving and can be disassembled and carried along in the trunk or elsewhere for use when needed.

I claim:

1. A safety hauling coupler, comprising a buffer tube with a spring fitted thereover and two pin holes at one end and a slot at the other, two extension tubes having pinholes at both ends and fitted over and fixed to the buffer tube by means of retaining pins, two connecting tubes fitted in the extension tubes and having two pinholes and a hexagon socket screwed to one of them and a chisel-headed taper block fixed to the other, two hooked heads each consisting of a hook for holding loops at each end of a wire cable and a screw for screwing in female-threaded ends of the connecting tubes, two sleeves having a plurality of pinholes and adjustably fixed to the connecting tubes and the wire cables, and six retaining pins for fixing purposes so that after the wire cables are attached to supports on a hauling vehicle and a hauled vehicle and fitted in the sleeves, the safety hauling coupler joins the two vehicles and is adapted to absorb the kinetic energy of shock load and prevent the hauling vehicle from being hit by the hauled vehicle.

* * * * *